(12) United States Patent
Pohle et al.

(10) Patent No.: US 6,275,779 B1
(45) Date of Patent: Aug. 14, 2001

(54) PROGRAMMABLE THERMOGRAPH AND COMPUTER SYSTEM FOR TIME AND TEMPERATURE READOUT AND STORED DOCUMENTATION

(75) Inventors: Budd T. Pohle, Camarillo; Janet E. Williams, Santa Paula; Robert D. Schilken, Ventura, all of CA (US)

(73) Assignee: Time & Temperature Company, Ventura, CA (US)

( * ) Notice: Subject to any disclaimer, the term of this patent is extended or adjusted under 35 U.S.C. 154(b) by 0 days.

(21) Appl. No.: 09/162,880

(22) Filed: Sep. 29, 1998

(51) Int. Cl.[7] .................................................. G01K 1/02
(52) U.S. Cl. ..................... 702/130; 702/187; 700/300; 374/100; 374/102
(58) Field of Search ................. 702/130, 99, 131–136, 702/177, 187; 73/75, 77; 374/100, 101, 102, 103, 141, 132; 700/299, 300, 277, 278

(56) References Cited

U.S. PATENT DOCUMENTS 4,843,084 * 6/1989 Parker et al. ........................ 700/277
4,884,214 * 11/1989 Parker et al. ........................ 700/278

OTHER PUBLICATIONS

The Temperature Handbook (1995, vol. 29, pp. P28–P54).*

* cited by examiner

*Primary Examiner*—Marc S. Hoff
*Assistant Examiner*—Hien Vo

(57) ABSTRACT

A thermograph system and precision temperature sensor wherein a continuous running default time-temperature recording is made and available for subsequent computer readout and printout, and a simultaneous select time duration recording that is started and stopped for documenting time periods during which critical temperatures are involved, characterized by LCD instant readout of the highest and lowest F° or C° temperatures throughout a selected duration recording or said default recording, with a Driver-receiver for compatible voltage differential data transfer to and from a personal computer for downloading of select-duration and alternately default time and temperature recording data.

27 Claims, 6 Drawing Sheets

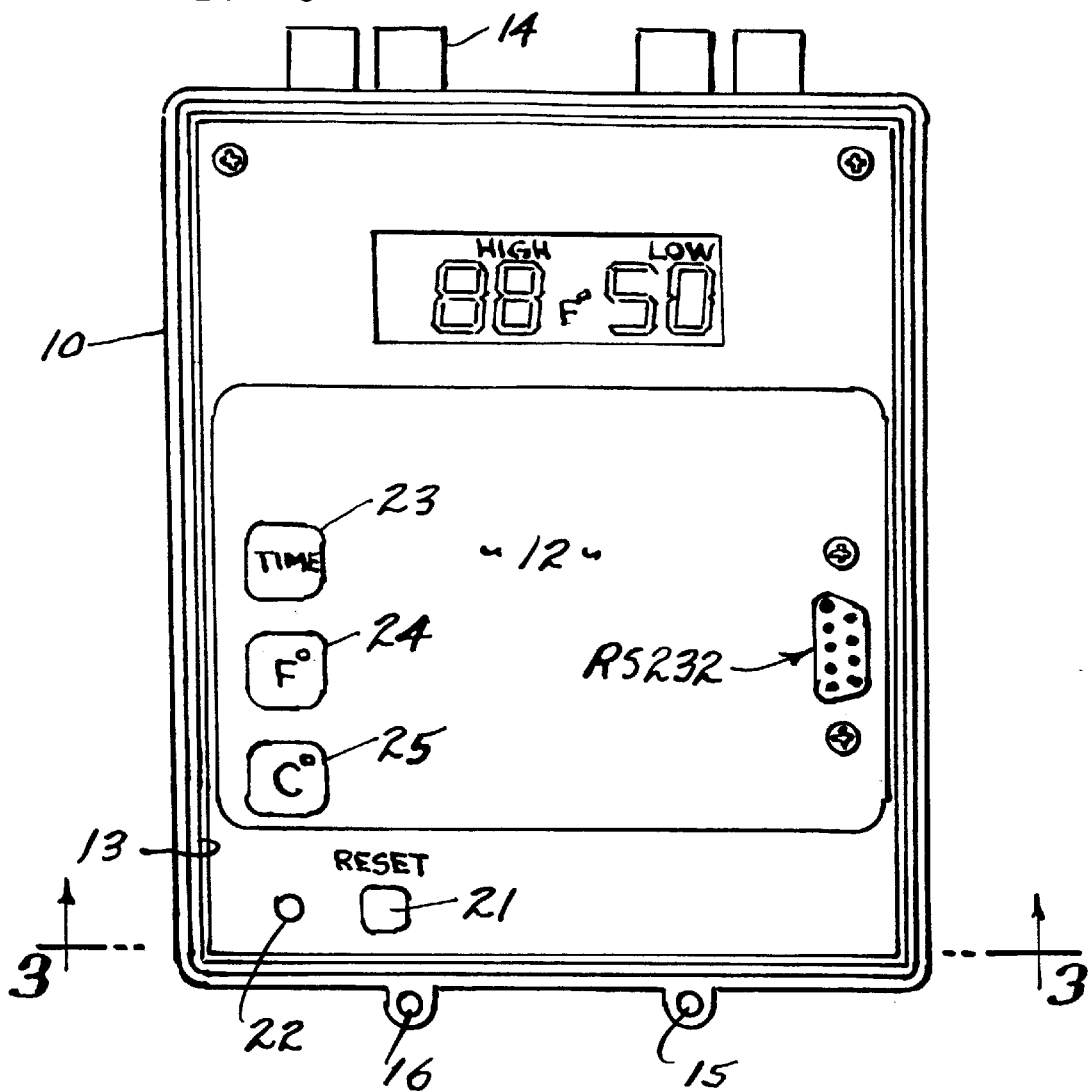
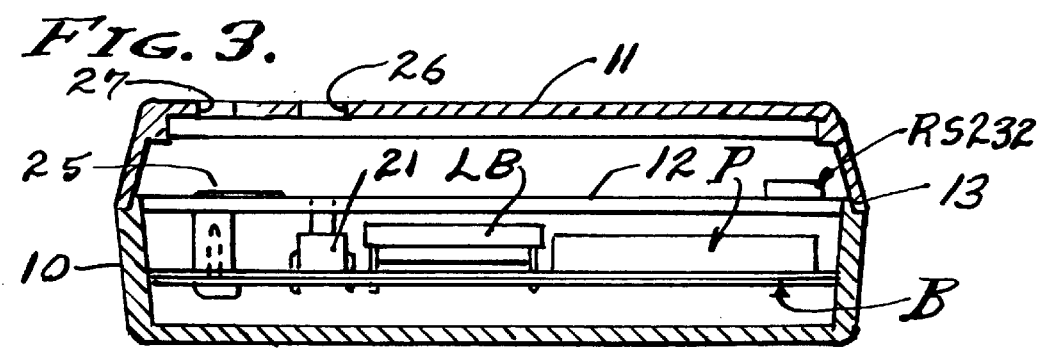

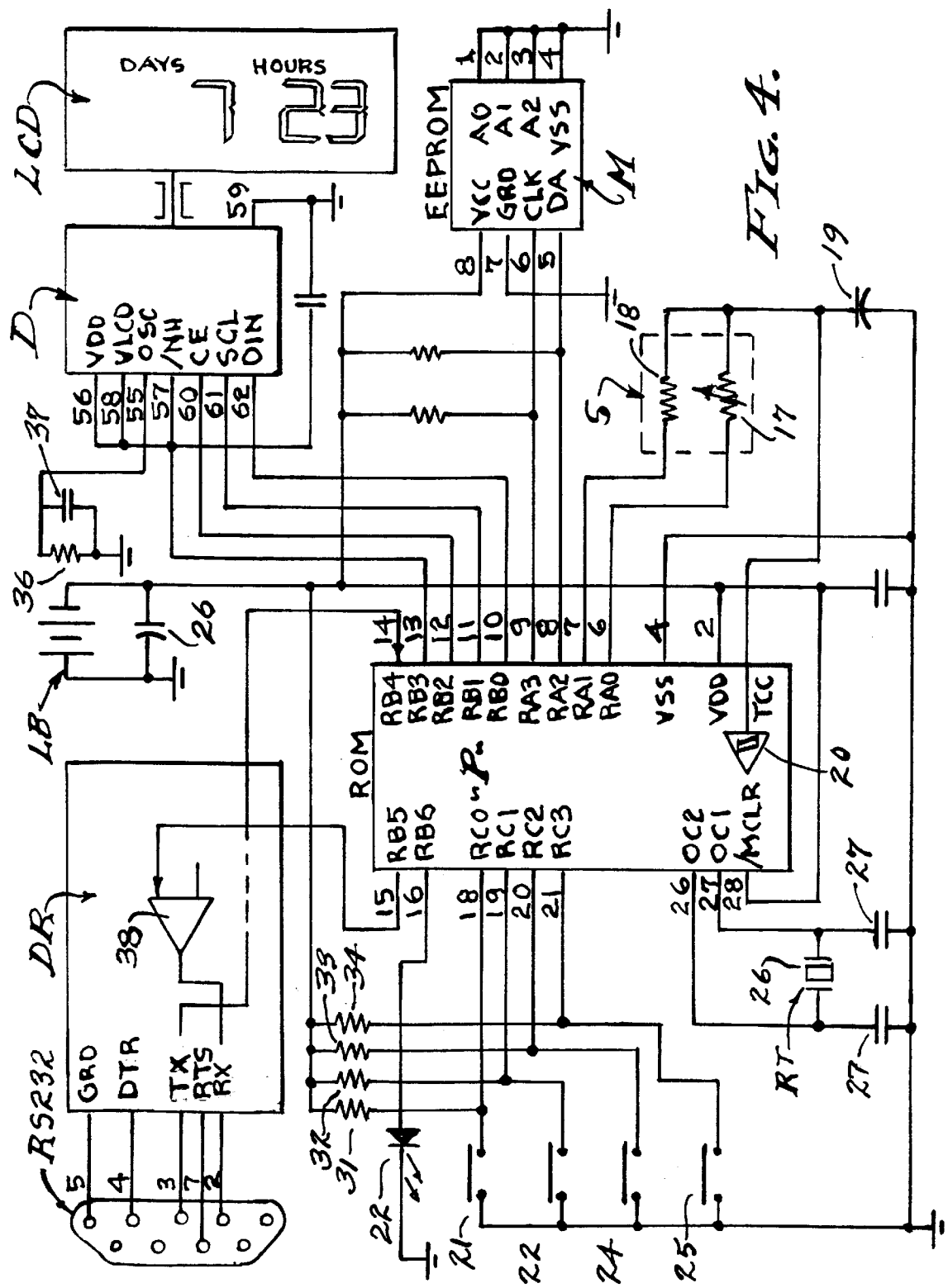

FIG. 10. G and G' or P1 and P2

```
TNT SMARTCHEK Data Log For Serial Number, 1131
Date,      Time,   Temperature-F
06/03/97,  15:08,  78
06/03/97,  15:23,  78
06/03/97,  15:38,  78
06/03/97,  15:53,  78
06/03/97,  16:08,  78
06/03/97,  16:23,  78
06/03/97,  16:38,  79
06/03/97,  16:53,  79
06/03/97,  17:08,  79
06/03/97,  17:23,  79
06/03/97,  17:38,  79
06/03/97,  17:53,  79
06/03/97,  18:08,  79
06/03/97,  18:23,  78
06/03/97,  18:38,  78
06/03/97,  18:53,  78
06/03/97,  19:08,  78
06/03/97,  19:23,  78
06/03/97,  19:38,  78
06/03/97,  19:53,  77
06/03/97,  20:08,  77
06/03/97,  20:23,  77
06/03/97,  20:38,  76
06/03/97,  20:53,  76
06/03/97,  21:08,  76
06/03/97,  21:23,  76
06/03/97,  21:38,  76
06/03/97,  21:53,  75
06/03/97,  22:08,  75
06/03/97,  22:23,  75
06/03/97,  22:38,  75
```

PROGRAMMABLE THERMOGRAPH AND COMPUTER SYSTEM FOR TIME AND TEMPERATURE READOUT AND STORED DOCUMENTATION

BACKGROUND OF THE INVENTION

This invention relates to thermographs and in particular those which are used in the storage and transport of perishables that are subject to critical temperatures ranging from chilled to frozen, it being a general object of this invention to provide an accurate and reliable electronic system for instant visual determination of adherence to requirements relating to time and temperature. Also, to provide documentation from stored data down-loaded from the thermograph and which is stored for subsequent readout or printout. In practice, a Liquid Crystal Display (LCD) is employed for instant visual Day-Hour time, and for High-Low temperature readouts, from an Electrical Erasable Programmable Read Only Memory (EEPROM). A personal Computer is employed for graphic and tabular readout and for printing hard copy documentation. Time and temperature data source is electronic and stored in the memory chip at selected time intervals for pre-programed trip durations. And, all of which is self contained in a battery powered unit.

It is the consignee of a shipment of perishables with which this invention is particularly concerned, and the trip-end information desired is selected by said consignee as may be required of the shipment involved. Accordingly, this is an electronic temperature recorder for use "In-Transit" or "On-Site" for monitoring perishables and temperature sensitive goods such as fresh fruits and vegetables, fresh or frozen meat, fish and poultry, processed foods, floral and nursery stock, seed, bulbs and fresh cut flowers, pharmaceuticals, blood, chemicals, film, resins, ink, leather, and any product that can be adversely affected by improper temperature. For example, asparagus is a commodity that must be transported within a narrow recommended temperature range of 32°–35° F./0.0°–1.7° C. and heretofore shippers have been known to refuse such shipments because of the inability to accurately operate within such temperature requirements. However, with the system concept herein disclosed the recipient or consignee is able to instantly extract and visibly examine exact information from the thermograph by viewing the LCD, using a simplified control panel, thereby eliminating the necessity of a strip-chart or conventional printout.

This electronic temperature recorder is not only provided for one-time "In-Transit" monitoring, but is also provided for repeated "On-Site" and "Fleet-Truck" monitoring; also for cold rooms, laboratories, freezers (walk-ins), restaurant facilities, retail outlet facilities, meat lockers etc. Generally, this electronic thermograph is adapted for use anywhere product safety and quality is dependant upon refrigeration and/or protection against heat and cold. It is therefore an object of this invention to provide data that can be instantly viewed by personel in charge of a facility, or mobile unit, and data that can be viewed at any time, printed and stored for future reference, all in accordance with Hazardous Analysis of Critical Control Points (HACCP) Government Requirements. A feature is the down-loading of time and temperature information into available computers, for example the widely used Personal Computers (PC's) with Windows by providing a driver-receiver means for converting instrument CMOS level information signals into PC level information signals to enable down-loading.

The stored information is retrievable in visual or printed form by the consignee at the end of a trip, or by the instrument source personel when the instrument is returned to said source; using state of the art Personal Computers (PC's) for viewing and for documentation. In practice, a pre-programmed diskette is included with each thermograph to operate a PC running Microsoft Windows, or the like.

The shipment of goods involves time periods varying from a day to a month or two, or more. Therefore, thermographs of the type under consideration are prepared to accommodate varied recording time periods, for example 5, 10, 20, 40 and 80 days; and corresponding chart formats are provided therefor. Heretofore, such instruments with or without strip-charts installed therein have been supplied to the shippers of goods in ready form to be started by the shipper when the transit period begins. Quite often however, the shipper fails to start the instrument in which case no recording is made during transit, it being an object of this invention to ensure a time and temperature recording regardless of whether the shipper started the instrument. This is accomplished by initiating operation of a default mode at the time of manufacture thereby putting the instrument in a permanent running condition. For example, a default time and temperature data recording mode is programmed for sampling temperature at 1 hour intervals, repeatedly going through the bit memory capability of the EEPROM during the shelf-life of the battery power supply.

In accordance with this invention, when the instrument is started to record a trip of pre-programed duration the default mode recording is preempted and the pre-programed trip recording mode is started to sample temperature at closely spaced time intervals for high resolution, for which this instrument is notably capable. For example, 15 minute sample intervals are pre-programmed in any one of the 5, 10, 20, 40, and 80 day chart modes. It is to be understood that the recipient of the instrument has the choice of a hard copy document in addition to an instant visible readout of the Liquid Crystal Display (LCD) of the instrument. And in the event that the shipper did not start the instrument, nevertheless there will be a full and complete time and temperature recording for a period up to 85 days (approx.) which is the memory capacity of the instrument using a 65568-bit EEPROM and based upon 15 or 60 minute intervals, for stored data at a high or a reduced resolution.

Documentation of time and temperature data is unnecessary, as the receiver of goods has the opportunity of inspection and acceptance without the instrument data. However, in the event of questionable temperatures, reliable documentation then becomes necessary in order to determine time and temperature conditions to which the goods were subjected in transit. Therefore, it is an object of this invention to provide down-loading means by which time and temperature data stored in the instrument is made compatable with a Personal Computer (PC) and from which hard copy documents can be made at any time after the trip period has ended. In the preferred form this documentation capability is implemented by an IBM personal computer running Microsoft Windows®, and by providing a programmed diskette with each instrument, there being ports in the form of a standardized female nine pin RS232 connector on the instrument for down-loading it into a PC for screening and for printer readout of hard copy charts on standard sized paper.

The thermograph instrument as it is herein disclosed is characterized by its ROM based CMOS microcontroller that governs all functions not controlled by the shipper and receiver personel. In practice, a Read Only Memory ROM Based 8-Bit CMOS Microcontroller is employed to establish real clock time and to select time intervals for triggering sequential recordation of temperature samples associated with time, and for transmitting associated time and temperature output to and from a memory. The microcontroller is responsive to manual switches to begin and end recording, and including means to separately recall time and temperature sampled during the recording. Shipping is world wide, in which case In-Transit goods must pass from Time-Zone to Time-Zone. Therefore, it is an object of this invention to provide time zone correction means, whereby the consignee's real time is automatically displayed and documented. Accordingly, the aforesaid diskette that goes with the instrument contains software that programs the consignee's personal computer for correcting any variation in time difference between the shipper and the consignee.

The microcontroller chip is initialized at the time of deployment to the shipper for performing the aforesaid instrument operations, the power supply battery being permanently soldered into the instrument circuit at the time of manufacture for its continued operation.

A significant feature is that "HIGH" and "LOW" temperature data is instantly available at any time the LCD is open for observation, in either Farenheit or Celsius readings, this function being enabled by precluding both "pre-record" and "post-record" time periods from the LCD display, so that temperature saturation of the goods is complete whereby temperature response of the instrument is properly displayed and/or recorded only when goods temperature has been normalized.

SUMMARY OF THE INVENTION

An electronic thermograph is provided for recording temperature samples throughout real calendar time periods, with instant time and critical temperature display during and after a recording period, implemented by a shipper for transit to a consignee, the used recording time duration and the HIGH-LOW temperatures being instantly available by means of LCD observation, the time period and sequence of temperature data being stored for screening by computer for subsequent graphic display and printed graphic and/or tabular hard copy. This is a self contained instrument provided with clock means and temperature sensor means for recording temperature samples in a series of point in time information data, the time related temperature samples being stored in an Electrical Erasable Programmable Read Only Memory (EEPROM) which is made compatable with a computer for retrieving the time and temperature information, preferably an I.B.M. Personal Computer (PC) running on Microsoft Windows . A feature is the conversion therein of CMOS level data information through a nine pin RS232 connector to PC level data information to be screened and/or for printing said information. Another feature is the initial programming of a microprocessor and preferably a ROM based 8-bit Microcontroller PIC16C57LP as manufactured by Microchip, for international time zone recording of high resolution real calendar time and temperature data while establishing a pre-programmed recording selected time duration trip data for subsequent retrieval. Still another feature is the back-up default mode for low resolution time and temperature data storage that is inherently recorded during the shelf (battery) life of the instrument, regardless of whether the aforementioned pre-programmed recording (trip) time duration was implemented by the shipper. It is also another feature to enable several utilitarian modes of instrument operation; 1) for use as a one time "In-Transit" trip recorder; and 2) for use as an unlimited time "On-Site" recorder for repetitive monitoring over non-determined time periods. The temperature sensor means is a thermister combined with a temperature calibration circuit for improved data accuracy.

The foregoing and various other objects and features of this invention will be apparent and fully understood from the following detailed description of the typical preferred forms and applications thereof, throughout which description reference is made to the accompanying drawings.

THE DRAWINGS

FIG. 2 is a top plan view of the control panel of the instrument which characterizes this invention, and FIG. 3 is a sectional view taken as indicated by line 3—3 on FIG. 2.

FIG. 4 is an electrical schematic of the chip circuitry as realted to the controls, the temperature sensor, real time clock, the LCD and the RS232 port which characterize this invention.

FIGS. 9 and 10 are examples of the product of this instrument and its system of operation, FIG. 9 showing a typical PC graphic recording display, and FIG. 10 showing a typical PC chronological listing display.

Figure 1:
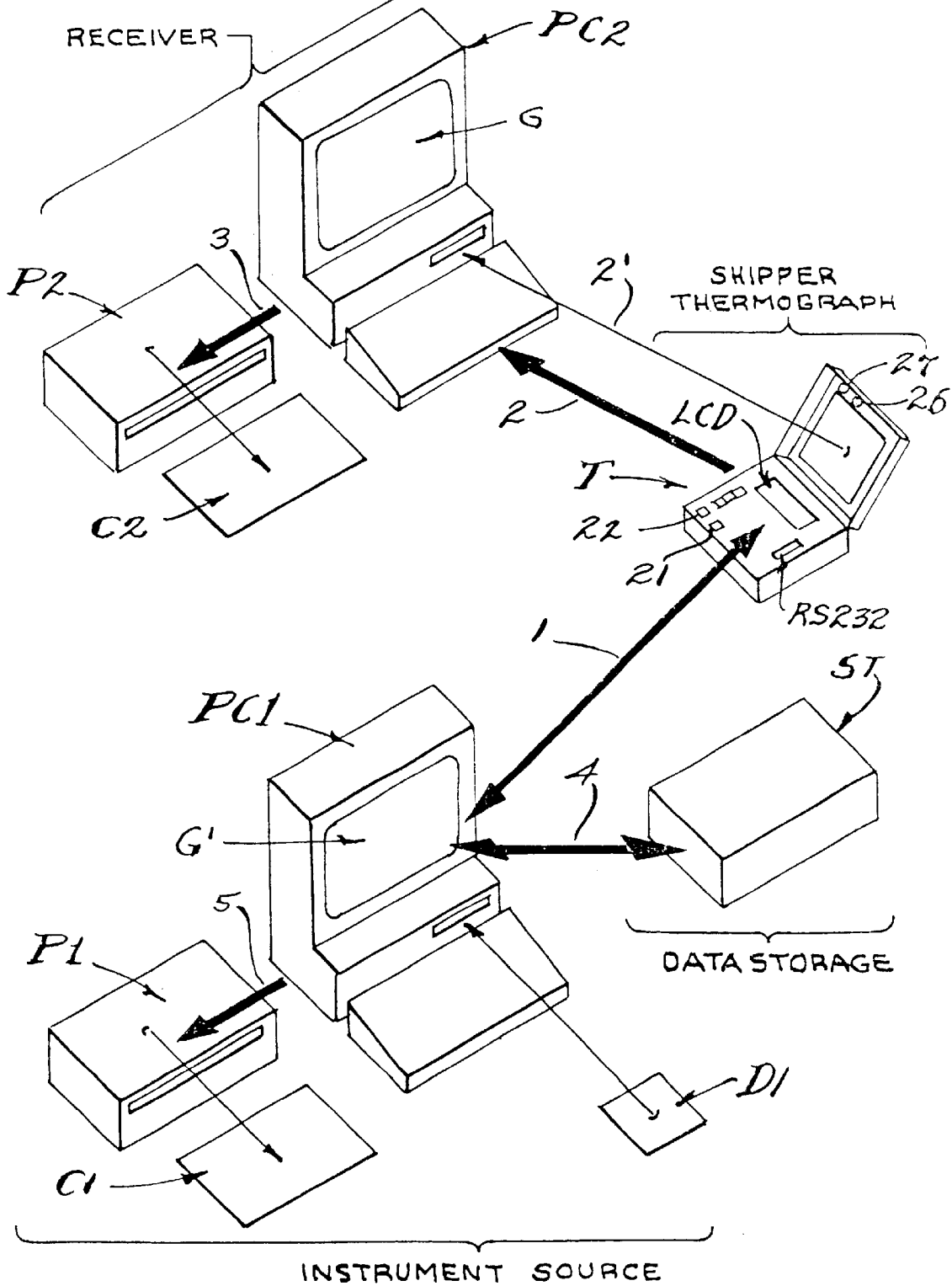
FIG. 1 is functional schematic showing the components of this invention in perspective relationship.
Figure 5:
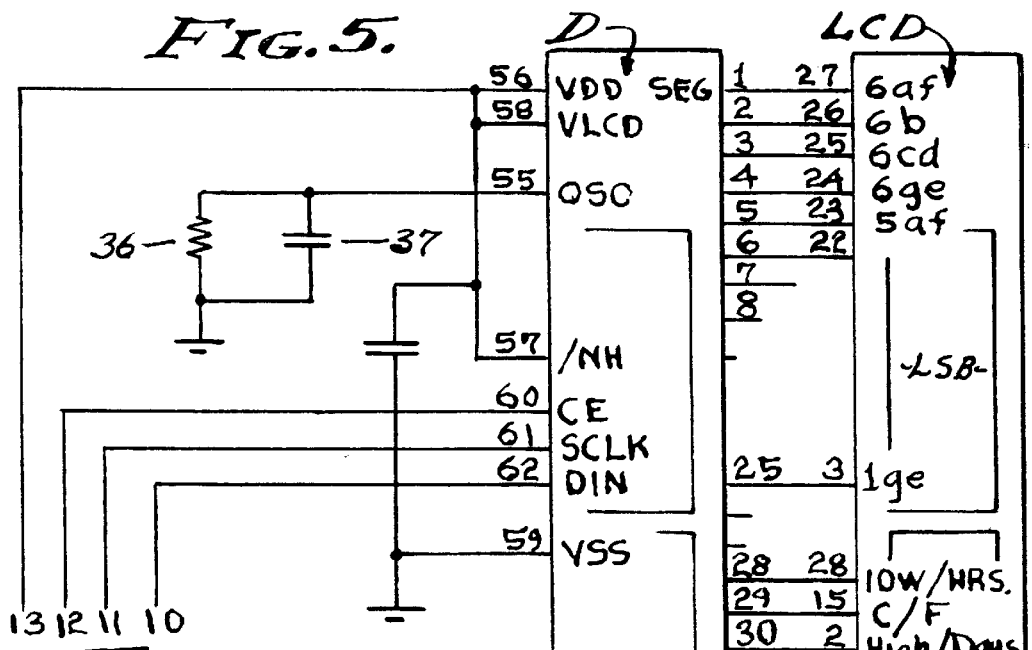
FIG. 5 is an electrical schematic of the Driver and Liquid Crystal Display (LCD) and its oscillator.
Figure 7:
FIGS. 7 and 8 are views of the LCD window as shown in FIGS. 2 and 4, each showing a different mode of display.
Figure 8:
Figure 6:
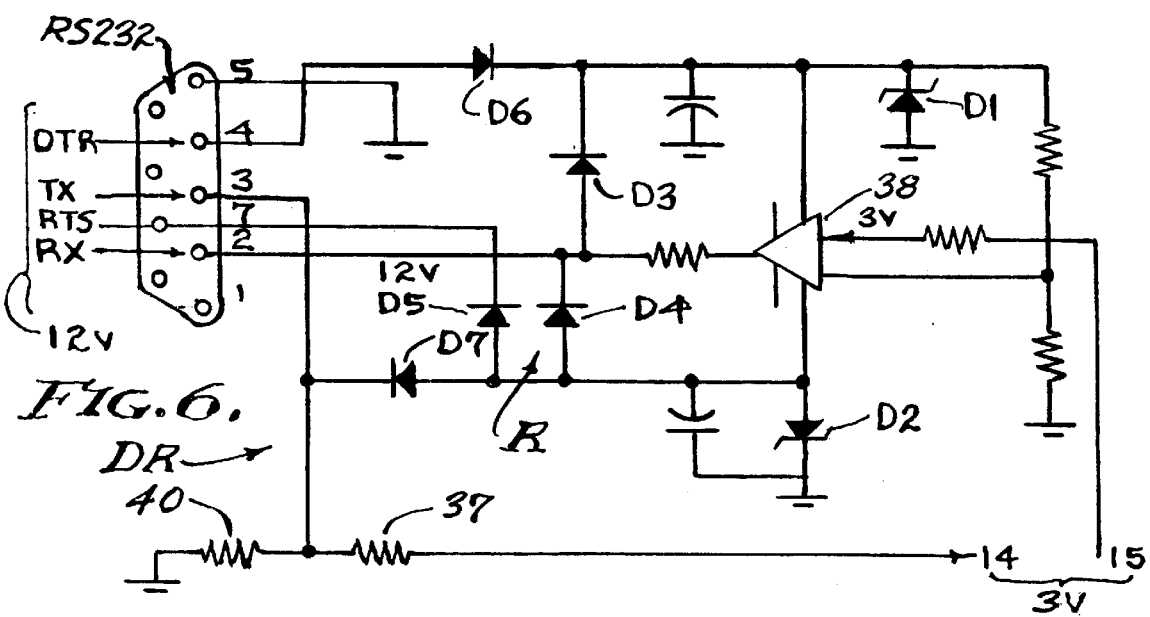
FIG. 6 is an electrical schematic of the Driver-Receiver that is provided for comparability of this instrument with state of the art Personal Compumters (PC's).
Figure 9:
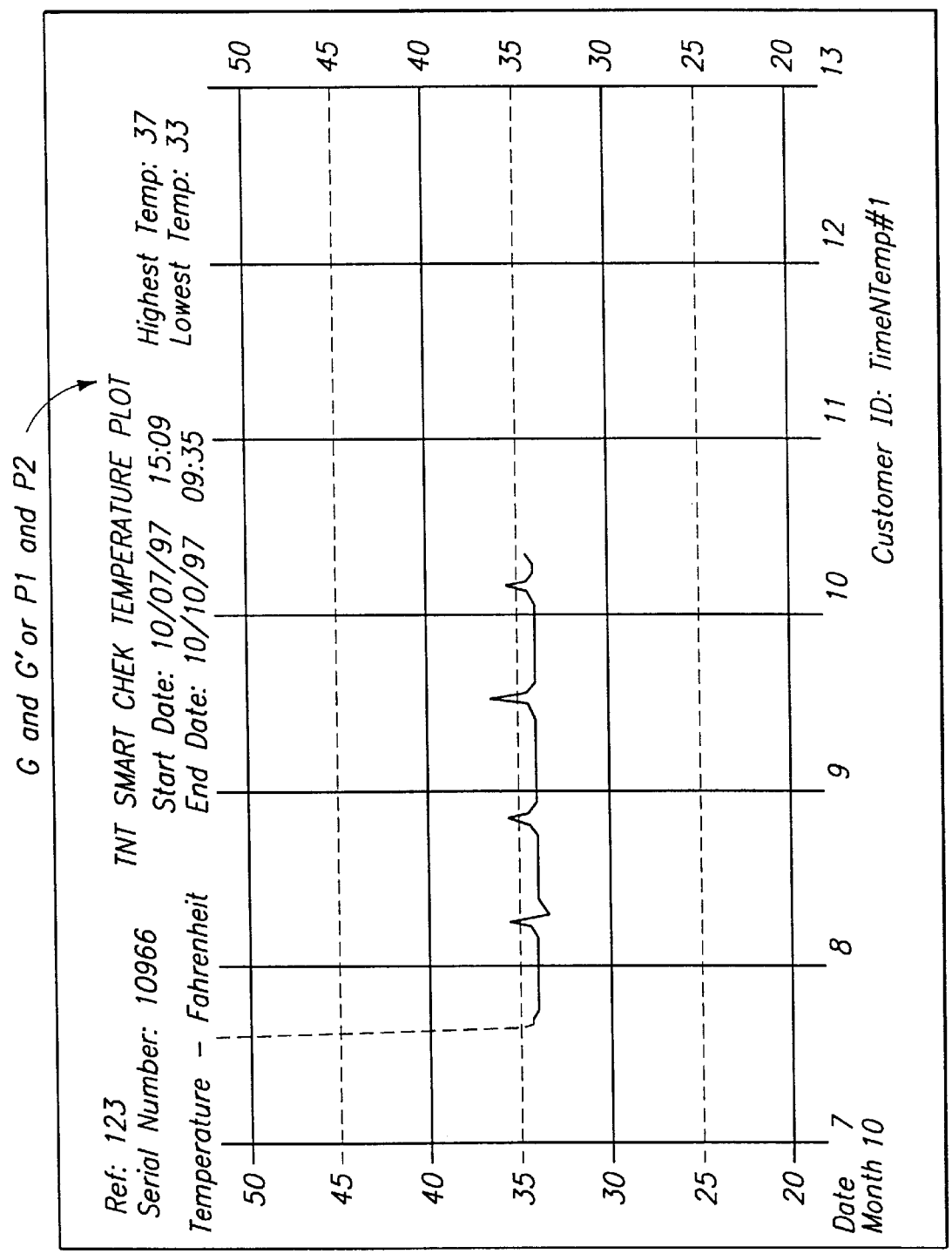

PREFERRED EMBODIMENT:

Referring now to FIG. 1 of the drawings, the thermograph instrument T is initialized at its source by a Personal Computer PC1 and is programmed thereby to have subsequent command by a consignee-receiver or by an authorized observer with or without a Personal Computer PC2, for instantly observing HIGH and LOW temperature recording, and for screening and documenting continuing sequence temperatures during a time period. Real time adjusted to international time zonesisof the essence.

Software in the form of a diskette D1 is applied to the source PC1, for initializing the thermograph instrument T with the required programming as indicated by arrow 1. In practice, the instrument T is initialized through a nine pin female RS232 connector ports so as to sequentially record temperature at sample intervals of, for example 15 minute intervals during a time duration of 5, 10, 20, 40 and 80 (approx.) days, as specified by the shipper and receiver.

This thermograph instrument is characterized by a Liquid Crystal Display LCD instant readout window that displays elapsed time or HIGH and LOW temperatures sampled during the recording period. Recorded data is interconnected through the RS232 connector as indicated by arrow 2 and down-loaded from the instrument, and information data is transferred to PC2 which is programmed by software furnished with the instrument T and in the form of a diskette D2 inserted into PC2 as indicated by arrow 2'. Time and temperature is thereby made available for observation and storage. As shown, a time and temperature display is available as in the form of a graph onthe screen G of PC2, and hard copy C2 is available in the form of a graph or tabulation from printer P2, as circumstances require. The computer PC2 and printer P2 are interconnected as indicated by arrow 3.

When the receiver or consignee does not have a computer (or for any other reason) the instrument T is returned to its source and the time and temperature information data is interconnected through the RS232 connector as indicated by arrow 1 and down-loaded therefrom and transfered into storage means ST as indicated by arrow 4, and time and temperature data is available at screen G' of the source PC1, and hard copy C1 is available from a printer P1 as may be required. A feature is the down-loading of a default time and temperature stored recording, whether or not the prescribed time period was started by the shipper. The computer PC1 and printer P1 are interconnected as indicated by arrow 5.

This thermograph instrument T is constructed in the form of a box 10 and cover 11 in which a control panel 12 is fastened so as to enclose a circuit board B that carries and electically connects the cooperatively associated components of the instrument. Peripheral joinder of the box 10 and cover 11 is sealed by continuously overlapped tongue engagement 13, the cover being attached to the box by a hinge 14 and closed by a hooked latch 15. A frangible cord type seal (not shown) is laced through mating openings 16 through the box and cover to prevent unauthorized access. The face of the panel 12 features a RESET switch 21 (a start switch) and an indicator light LED 22, a TIME switch 23, a Fahrenheit switch 24, and a Celsius switch 25. The switches 21–25 are "Tact" (tactile) switches for manual actuation. The cover 11 closes the box 10 to protect the features 21–25 and the female RS232 connector port.

A feature of this thermograph instrument T is the access openings 26 and 27 through the cover 11 and in alignment with the RESET switch 21 and LED 22, for external operation of said switch and observation of said LED, when the box is closed and secured by the seal. In practice, the instrument T is closed and sealed by the instrument supplier and then delivered to a shipper to be subsequently started and placed with a shipment of perishable goods by a dockman or clerk who actuates the tact switch 21 by inserting a pointed instrument (a pencil or pen) through the opening 27 while observing the LED 22 through opening 26 so as to ensure starting. Neither shipper or his dockman or clerk or any other personel are to be permitted to have access into the instrument, except through openings 26 and 27 when used as an In-Transit recorder.

This thermograph instrument T is electronic and includes the following major components; a power supply battery LB, a temperature responsive sensor means S, a real Time means RT, a ROM based 8-bit CMOS Microcontroller P—No. PIC16C57LP as manufactured by Microchip or equivalent, an Electrical Erasable Programmable Read Only Memory M (EEPROM)—No. 24LC65 as manufactured by Microchip or equivalent, a Liquid Crystal Display LCD—(Proprietary) as manufactured by Safaring Technology Ltd. or equivalent, and a driver D therefor—No. NJU6432BF as manufactured by New Japan Co. Ltd. or equivalent, and a computer access interface means including a nine pin female RS232 connector port to an external PC1 and PC2 with readout screens G1 and G2, and each with printers P1 and P2 respectively. The control panel 12 exposes the LCD and the RS232 connector port and also the personel command controls including the start RESET switch 21, the end TIME switch 23, the Fahrenheit selector switch 24, the Celsius selector switch 25, and the operation light LED 22.

Referring now to the power supply block, a direct current unregulated 3 Volt Lithium battery LB is conditioned with a capacitor 26 to a negative ground permanently soldered (hard wired) into the circuit board B at the time said board is fabricated, putting it into continuous (untimed) operation.

Referring now to the sensor means S, there is provided herein means responsive to probe temperature, or to surrounding air temperature by sensing variable resistance of a thermister 17 from pin 6 of the microcontroller P and in parallel with a precision linear resistor 18 from pin 7 of said microcontroller. The thermister 17 and precision resistor 18 have a common output to a Schmidt trigger 20 in the microcontroller P and charge a Tantalum timing capacitor 19 connected to ground for determining the resistance ratio relative to the temperature of the load which is being monitored, by measuring elapsed time as a function of temperature in order to establish an Analog-To-Digital-Converter (ADC). Accordingly, there are two circuits, a reference circuit through resistor 18 and a variable resistance circuit through the temperature responsive thermister 17. The Tantalum timing capacitor 19 is charged in order to operate the Schmidt trigger 20 (provided in the microcontroller chip) inversely proportional to the balance of resistance between said two circuits. The precision resistor 18 of the reference circuit charges the Tantalum timing capacitor 19 to the operational threshold of the Schmidt trigger 20 during a time period that is inversely proportional to said resistance. The difference in resistance between the two circuits is precisely measured to represent the ratio of the thermister 17 resistance as compared to the reference voltage of resistor 18, thereby resulting in an absolute thermister resistance voltage independent of the trigger threshold and/or individual capacitor voltage. The sensor means S is thereby adjusted so as to produce a voltage representing temperature, and it is this voltage that is then processed by calculating means for determining equivalent Fahrenheit and Celsius voltages for LCD temperature display, and/or to be screened and documeted and/or stored for subsequent retrieval. The resultant thermister resistance voltages are mathematically converted in the microcontroller P by calculating means for converting analog voltage into digital Fahrenheit voltage, and by the ADC means for converting analog sensor voltage into digital Celsius voltage, all of which is responsive to Fahrenheit and Celsius selector means in the microcontroller activated by the Fahrenheit and Celsius selector tact switches 24 and 25.

In accordance with this invention, the Analog-To-Digital-Converter (ADC) is implemented as above described. Firstly, according to Ohm's law, the amount of current I flowing through a conductor has a quantity of resistance R equal to the degree of Voltaic Potential V causing electron flow divided by the resistance; mathematically stated $$I = \frac{V}{R}$$

Increasing V increases I, whereas increasing R decreases I.

Secondly, there is the Tantalum timing capacitor 19 with a regulated voltage source applied accross its two conductive plates, causing a charge to build up and because of intervening dielectric plates will not allow current to pass. When the voltage is suddenly removed, said charge will remain and so will the corresponding voltaic field accross the dielectric. By connecting resistor 18 across the capacitor 19, the charge on the plates becomes a current through the resistor 18, and over time said voltage across the capacitor 19 will dissipate to 0. This relationship between the voltage across the capacitor with respect to time is expressed as $$V_c = V_i e^{-\left(\frac{t}{RC}\right)}$$

$V_c$ is the voltage across the capacitor with respect to time t; $V_i$ is the initial voltage across the capacitor; R is the resistance and C is the capacitance. Dimensional analysis of RC reveals a unit of time, and for this reason RC is referred to as the "time constant" of the equation; e's exponent must be or is without dimension. This function is logrithmic. For example, Vc reveals that after one time constant it will be 37% of $V_i$, after two time constants it will be 13%, after three time constants it will be 0.05%, and after four time constants it will be 0.018%. This relationship is true for charging the capacitor, and the amount of time that it takes for the voltage across the capacitor to reach a particular value is dependent upon the voltage already across the capacitor at the time of charging or discharging it. The critical elements of concern then are the thermister 17, the precision resistor 18, and the Tantalum capacitor 19, and also the microcontroller pins RA0, RA1, and TCC pins 6, 7 and 1. Said thermister 17 will be referred to in the equation herein as T a device whose resistance is a function of temperature, the precision resistor 18 will be referred to in the equation herein as R a specially made reisistor that does not change its value due to change in temperature. And, said capacitor 19 will be referred to in the equation herein as C a timing capacitor.

Referring now to the microcontroller block generally, the microcontroller P is a processor capable of executing arbitrary sets of software instructions or programs. The present invention's basic programs are retained in the microprocessor which is an Electrically Programmable Read Only Memory (EPROM). This EPROM is purchased blank (not programmed) and is programmed but once and indefinitely retains its programing.

In addition to the aforesaid programmed EPROM, the microcontroller contains a finite amount of Random Access Memory (RAM) available to the programming for temporary storage of intermediate values. Unlike the EPROM, this additional memory is volatile, so that if the power supply fails the memory is lost. Furthermore, when power is first connected to the microcontroller the contents of the RAM is generally unknown.

The connections VSS and VDD pins 2 and 4 are the power connections. VDD is the 3 volt LB battery connection. And, VSS is the connection to ground.

Referring now to the Real Time means RT, the OC1 and OC2 pins 27 and 26 access two oscillators (not shown) which are built-in circuits allowing the use of an external quartz crystal 26 as a frequency base. Capacitors 27 and 27 are provided to ensure that the quartz crystal oscillator starts functioning, for example at extreme low temperatures. However, microcontrollers are very reliable and are extremely predictable, accomplished by creating a stable continuous clock signal. The clock signals alternate between logic 1 and logic 0 continuously and rapidly as well as precisely. Counting transitions is between 1 to 0 and 0 to 1 in Real Time measured as milliseconds, second, minutes, hours, days, months and years. Therefore, this crystal based oscillator is the time base of the Real Time Clock (RTC) that is relied upon herein.

The Real Time Clock of the present invention is responsive to software instructions. The Master Clear /MCLR is active when at logic Low at pin 28 and resets the microcontroller. That is, as long as this pin is held at a Low logic level the microcontroller will be in its reset state. The reset state prepares the microcontroller to be ready to execute its programs by placing most of its internal means at known states. The programs do not begin running until the logic level at /MCLR is driven High.

The pins RA0 through RA3, RB0 through RB7, and RC0 through RC7 are the port pins. RA0 is for Register A bit 0, and so on. The register (not shown) is internal of the microcontroller and accessible to the software but not to the means or devices connected to the aforesaid pins. In general, the port pins are employed to either sense the logic level presented to them as digital inputs, or to create a certain logic level as a digital output, giving the microcontroller external access. Thus, a port is chosen by a program instruction to be arbitrarily an input or an output. When set to be an input, the ports are of generally high impedance and draw extremely little current, for example as follows:

1) RB5 pin 15 is an output utilized as the data-out signal TXD transmitting data through the RS232 block. This circuit is toggled to alternate between logic levels by a hardware means (not shown) internal to the microcontroller and known as a Universal Asynchronous Receiver Transmitter (UART) which is the mastermind behind communication with the Personal Computer PC1 and PC2, as by means of patch cords at 1 and 2.

2) RB4 pin 14 is the receiver of the RS232 Data (RXD) and also connected internally to the UART (not snown).

3) RB6 pin 16 drives the Light Emitting Diode (LED) by a logic 1 to turn it ON, a logic 0 turning it OFF, as controlled by software programming instruction.

4) RC0 through RC3 pins 18 through 21 are set by the program as inputs, giving the program a means of sensing the state of the tactile tact switches 21, 23, 24 and 25.

5) Resistors 31 through 34 are normally open pull-up resistors connected to a 3 volt buss, a logic 1 being sensed therefrom by the program.

When a switch 21, 23, 24 or 25 is depressed the corresponding port pin is connected to ground and a logic 1 will be sensed. It is the program which senses the condition of the switches. Since any switch can be depressed at any time, the microcontroller is programmed to continuously monitor the ON-OFF state of these four controlling switches.

Referring specifically to the microcontroller EEPROM which is dedicated here to the storage of selected software programs, and to the volatile RAM in said controller, the present invention requires the storage of large amounts of logged information far exceeding the RAM capacity. Therefore, the memory means M is provided in the form of an EEPROM as next described.

Referring now to the memory M and the Electrically Erasable Read Only Memory (EEPROM) the power connections are VCC at pin 8 and VSS at pin 4. This chip is connected to the microcontroller chip by Clock CLK pin 6 and Data pin 5 which are connected to the microcontroller port pins RA2 pin 8 and RA3 pin 9, one of the two serial busses. The EEPROM is a common oriented slave means, commanded to either write data to itself or return data. When the microcontroller wants to do something with the EEPROM it first sends a pattern of bits representing which EEPROM address is concerned, along with a bit indicating whether a read or write operation is requested. If it is a write operation the microcontroller next sends a pattern of bits to be stored at the previously sent address. When a read operation has been commanded the EEPROM sends back the pattern of bits currently stored at the previously sent memory address.

During write operations, RA2 and RA3 are configured by the program to be outputs. In order to keep the outputs connected to the inputs the EEPROM is in its default state (waiting for a command), its CLK and DA pins being inputs. When the EEPROM receives a Read Data Command, it turns its DA line into an output, whereby the microcontroller program becomes responsible for correspondingly turning RA3 into an input, allowing the program to read the serial flow of data bits as they arrive.

The EEPROM pins A0, A1 and A2 pins 1, 2 and 3 are connected together in order to increase the memory capacity available to the microcontroller. As shown, these pins are tied together to VSS and ground, so that when writing to one of them the others will also see the same signals. And, when sending the address portion of a command to the EEPROM the pattern of the particular EEPROM's A0, A1 and A2 lines are included for which the command is intended.

Referring again to the microcontroller P, this chip has within it a counter which is incremented by logic transitions on a Timer Capacitor Charge means TCC at input pin 1, which then may be detected by a software program. The manufacturer calls this pin TOCKI, for "Timer 0 Clock Input". The inputs of a digital means or device detects the logical levels presented to them and in the CMOS circuit the transmission between logic levels occurs quickly, going from logic High to logic Low (and vice versa) in a few billionths of a second. In slower changing circuits where this might become a problem, the Schmidt trigger 20 is employed herein, for response to slowly changing input voltages, and also responds somewhat slower to fast transitions. Accordingly, in order to expand the possible applications of microcontroller. P, TCC pin 1 is a Schmidt trigger input which ensures operation of this circuitry.

Two circuits are involved, one involving $R_T R_T$ and the other involving $R_T C_R$. Ignoring $R_R C_T$ and with regard to the $R_T C_T$ circuit starting with fully charged $C_T$ capacitor 19, the time it takes for the voltage across $C_T$ to reach the Schmidt trigger threshold voltage depends upon the thermister resistance. Thus, the elapsed time is measured as a function of temperature acting as the ADC.

The ADC conversion is for example: First forcing RA0 and RA1 to be outputs and drive them to logic Highs. This charges C capacitor 19, and after four time constants V will be at a minimum of 98.2% of whatever RA0's value was. One time constant is 0.66 seconds, and four time constants is therefore 0.265 seconds. Since the thermister 17 ($R_T$) is in the circuit, four time constants would be something less. Next, RA0 is driven to a logic Low level 0, ie. a voltage close to 0 volts, and $C_T$ capacitor 19 begins to discharge, and simultaneously RA1 is run into a High impedance input, preventing current from flowing through resistor ($R_R$) thereby rendering it invisible to the measurement circuit. A software program is then applied to execute a loop of known duration counting the number of loops that have been exectuted until $V_c$ reaches the Schmidt trigger voltage level. The number of loops is stored as the conversion value.

In accordance with this invention there is a reference circuit in order to provide the accuracy required. In practice, the circuit is hedged, there being several sources of error in the converter circuit. For instance, the RA0 is driven to High and Low logic values, but what those values are varies with battery voltage and from copy to copy of the microcontroller P. Also, since the current following into the TCC pin 1 is practically nil in all cases, the exact Schmidt trigger voltage is not known, for the above reason. However, the ADC reference circuit is employed to reduce these adverse effects as follows: Before each and every temperature reading the ADC converter circuit is calibrated. After first charging $C_T$ capacitor 19, RA1 is driven to its High impedance input state, and the ensuing discharge time is measured and its value stored for subsequent use. The Stored value is used to eliminate measurement errors. There are two discharge equations are as follows:

$$V_c = (V_{RAO} - V_i)e^{-\left(\frac{t}{R_T C_T}\right)}$$

This equation describes the thermister circuit.

$$V_c = (V_{RAO} - V_i)e^{-\left(\frac{t}{R_T C_T}\right)}$$

This equation describes the reference circuit.

First we solve for TC and equate the two foregoing expressions, leaving $$\frac{t}{R_T} \text{Log}\left[\frac{V_c}{V_{RAO}V_i}\right] = \frac{t_R}{R_R} \text{Log}\left[\frac{V_c}{V_{RA1}V_i}\right]$$

According to the above equation, RA0 and RA1 voltages will be the same or nearly identical, said equation reducing to $$\frac{t}{R_T} = \frac{t_R}{R_R}$$

The entire right side of the equation is a constant, and letting $$a = \frac{t_R}{R_R}$$

we arive at $$R_T = \frac{t}{a}$$

What is true but not included in the foregoing analysis is the fact that the Shmidt-trigger error falls out of the equation in about the same manner, and is the same for both. What is actually logged are the values relating to the resistance of the thermister, the instrument requirment being a reading of the ambient temperature. The functions relating to these two values is exponential and heavily burdens the already small EEPROM if it were encoded. Therefore and in accordance with this invention, the nonlinear function is turned into a series of linear segments stored as a table of look-up values. A brief software routine is then applied to convert the given resistance values to their corresponding temperature relationships.

Referring now to the Liquid Crystal Display block, the LCD and its driver D, the LCD panel is comprised of two groups of three windows each, and a plurality of enunciator areas. Since the greatest number of digits is three in order to read days, hours, and temperature. There are separate groups of three characters, the characters being several letters and the numerals 0 through 9. Surrounding said windows the plurality of enunciator areas are appropriately placed to simultaneously display "days" and "hours", "high" and "Low" "° F.", and "High" and "Low" "° C.". The aforesaid groups of three windows are simultaneously activated with the enunciator areas associated therewith, and all of which is under control of the manually operable tact switches 21, 23, 24 and 25.

The Liquid Crystal Display block consists of the separate LCD and its related driver D, the schematic herein showing only those pin connections necessary to actuate a single window of the display and its associated enunciator areas. It is to be understood that the description of this single window character and its enunciator suffices for all windows of the LCD and connections to driver D.

The LCD is comprised of two transparent plates sealed together with a transparent compound with normally transparent polarized rod-shaped crystals suspended therein so that light normally passes perpendicularly through the plates. By imposing an alternating electric field across the compound the suspended crystals are polarized and oriented thereby so as to become obscure and appear dark to the observer. One of these plates is the backplane upon which is printed a transparent electrically conductive Indium based compound. The other plate is also printed with the indicia that is to appear when selectively activating the LCD segments and areas so as to create numerals and enunciators etc.

The characters herein have seven segments forming the numerals 0 through 9. Referring now to one of these numerals, the number "8", consisting of all seven disconnected segments, including horizontal top, bottom and middle segments, and the verticlly parallel left side and right side segments. These seven segments are designated as the top segment 'a' and proceeding clockwise an upper right segment 'b', lower right segment 'c' etc. until reaching the left upper segment 'f', and finally the middle segment 'g'. Arabic numerals 0 through 9 are created by driving combinations of said segments; for example a "1" is segments 'b' and 'c', a "7" is segments 'a', 'b' and 'c', and an "8" is all segments.

There are six seven segment numeral pins 1–6, and display window groups deignated MSB and LSB. This LCD is multiplexed and has two backplanes. Pins 1 and 29 are backplane energizers and for example, pin 27 energizes both segments 'a' and 'f' of numeral "6", one backplane being under segment 6a and the other under 6f. This method of sharing is referred to as "Time Multiplexing" which dramaticlly reduces the number of connections needed in order to implement the LCD, and also the driver therefor. Accordingly, a "High/Days" display is created by alternately driving enunciator pin 2, a "° C./° F." display is created by alternately driving enunciator pin 15, and a "Low/Hours" is created by alternately driving enunciator pin 28. The driver D applies a High or Low to these pins responsive to the commands of tact switches 21, 23, 24 and 25.

The driver D power supply connection are VDD pin 56 and VLCD (Voltage LCD) pin 58. The ground pin is VSS pin 59. The Circuit Inhibiter /INI pin 57 is activated by a logic 0 to shut off the driver D oscillator next described. These power connections are driven through port RB3 pin 13 of the microcontroller P.

The required alternating backplane voltage to control the LCD is provided by an internal oscillator (not shown) of the driver D. And, a time based frequency therefor is established by a resister 36—capacitor 37 circuit connected into the driver D at OSC pin 55 to govern said internal oscillator.

The driver D interface is provided with Chip Enable CE pin 60, Serial Clock SCLK pin 61, and Data In DIN pin 62. This is a clocked interface and can only be written to, and share the data and clock lines. The driver D has a Chip Enable CE input pin 60 and the microcontroller also sends control information over this serial bus in order to effect the desired display. All serial data and clock signals are ignored when CE is at a logic Low. The microcontroller P drives the CE pin 60 High prior to sending control information to the LCD driver D. The microcontroller also ends data and control information over this serial bus.

Referring now to the Interface Block and to the Driver Receiver DR, a feature that characterizes this invention, the microcontroller P and its associated CMOS circuitry operates at 3 Volts and would be destroyed if subjected to the 12 Volts of a state of the art Personal Computer PC1 or PC2. Accordingly, the driver receiver DR protects the microcontroller P by providing an intervening operational amplifier means 38, No. LM301A as manufactured by National Semiconductor, for increasing outgoing signal voltage, and by providing an intervening voltage reducer means R for reducing incoming PC signal voltage. The amplifier 38 increases the 3 Volt TXD signal from the RB5 pin 15 of the microcontroller to 12 Volts at the RXD pin 2 of the RS232 port so as to be compatible with PC voltage. Reversely, an intervening resistive circuit reducesthe prevailing PC voltage to 3 Volts at RB4 pin 14 of the microcontroller so as to be compatible with the CMOS circuitry thereof. Accordingly, whereas the output signal voltage from the microcontroller P differentiates as much as +3 Volts to 0 Volts, it is augmented to +12 Volts to 0 Volts at connector RS232; while the input signal voltage from PC1 or PC2 differentiates as much as +12 Volts to 0 Volts, it is diminished to +3 Volts to 0 Volts at RB4 pin 14 of the microcontroller P. The operational amplifier 38 draws its power from the Personal Computer PC1 or PC2 to which it is connected through RS232 pins 7,2,and 4. The serial data from PC1 or PC2 at TX pin 3 of RS232 is shown conditioned by a resistor 37 in a line to RB4 pin 14 of the moicrocontroller, there being a resistor 40 to ground, as shown. A bridge-like circuit comprised of diodes D5, D6 and D7 provides +12 VDC and −12 VOC to operational amplifier 38. Diodes D3 and D4, and Zenor diodes D1 and D2 prohibit high voltage discharge from damaging the circuitry.

In accordance with this invention, the instrument is implemented in top one of two forms, either as an "In-Transit Recorder" or as an "On-Site Recorder", the physical embodiment remaining the same in each, except that the In-Transit cover 11 is opaque to prevent access, whereas the On-Site cover is transparent for viewing at any time. The utility of the instruements is diverse in that the In-Transit instrument is preogrammed for a one-time lease use and a one-time trip recording of limited duration. The On-Site instrument on the other hand is intended to be sold outright to be used for any number of sequential recordings of duration within the 80 to 85 day duration of the memory at 15 minute sample time intervals. Therefore, the In-Transit instrument is prepared for a trip limited to a number of days, and the first and last hours of recording are ignored or deleted; whereas the On-Site instrument is not limited to trips or duration, and records to the limit of the memory and recycles through the EEPROM erasing the preceeding recording as the current recording progresses, and only the beginning hour of recording is ignored.

Firstly, in order to implement the microcontroller chip P for its use as it is shown and described herein, software is applied at the source of and by the microcontroller chip manufacturer in order to program the ROM and thereby establish said chip with permanent firmware as follows, whereby combinations of means are provided for performing the basic operations ascribed to either implementation of this dual purpose instrument. Accordingly:

The ROM is programmed for establishing a Clock means keeping a continuous running Real Time Clock Calendar.

The ROM is programmed to have a Temperature Sensor means for responding to the thermister probe resistance and for calculating and producing calibrated correct temperature information or data.

The ROM is programmed to have a low time resolution Default Temperature Continuous Recording means responsive to the clock means for long interval recording, preferably at 1 hour intervals, of sample time and temperature data storage into the EEPROM as read only serial available data, and including;

a) Means for recording the Highest temperature data,
b) Means for recording the Lowest temperature data,
c) Means for observing Current prevailing temperature data,
d) Means for recording Block (recording duration) data information,
e) Means for indicating the last block data recorded,
f) And, a Pointer means for indicating the last temperature data recorded.

The ROM is programmed to have a Time and Temperature Data Transfer means for storing the time and temperature data in the non-volitile memory EEPROM.

The ROM is programmed to have a Monitor means for responding to the personal PC1 or PC2 software command signals through the RS232 connector.

The ROM is programmed to have a Control means responsive to the manual control switches 22, 23, 24 and 25 including as follows;

a) A Time Duration means responsive to switch 23 for ending recording and simultaneously determining elapsed recording time (from a start) in days and hours (minutes and seconds),
b) A Fahrenheit F° resolving means responsive to switch 24 for converting the aforesaid temperature data into Fahrenheit value data for transfer to the LCD display for HIGH and LOW temperature display and/or transfer to the personal computer PC1 or PC2 for graphic display or readout.
c) And, a Celsius C° resolving means responsive to switch 25 for converting the aforesaid temperature data into Celsius value data for transfer to the LCD display for HIGH and LOW temperature display and/or to the personal computer PC1 or PC2 for graphic display or printout.

And, the ROM is programmed to have an Enunciator Mode Indicator means for identifying the active LCD display information including as follows:

a) A DAYS-HOURS enunciator segment activating means responsive to the Time Duration means controlled by switch 23,
b) A HIGH-LOW enunciator segment activating means responsive for Fahrenheit F° readout means of the ROM Control means as controlled by switch 24,
c) A HIGH-LOW enunciator segment activating means responsive to Celsius C° readout means of the ROM Control means as controlled by switch 25,
d) An F° enunciator segment activating means pre-empting toggle switch 25 and responsive to toggle switch 24 to either identify HIGH-LOW Fahrenheit temperature or alternately current Fahrenheit temperature,
e) A C° enunciator segment activating means pre-empting toggle switch 24 and responsive to toggle switch 25 to either identify HIGH-LOW Celsius temperature or alternately current Celsius temperature, Secondly, this is basically a dual purpose instrument and, in order to initiate either instrument implementation as shown and described herein, software is applied through connector RS232 ports of the circuit board B by the instrument manufacturer or distributor in order to program non-data portions of the EEPROM and thereby establish the model or type of instrument as circumstances require and as follows to thereby provide combinations of means for performing the specific functions ascribed to ether an "In-Transit Recorder" or an "On-Site Recorder", as follows:

The EEPROM is programmed to have a start recording means responsive to reset toggle switch 21 for starting recording by initiating serial flow of both time data and temperature data into the EEPROM, and alternately to cancel the LCD readout and restart recording (In-Transit only).

The EPROM is programmed to have a percentage of recording time "FULL" calculator and enunciator segment activating means for indicating percentage of memory time used, and to have a stop-start recording means for stopping a preceeding time and temperature recording while simultaneously starting a subsequent time and temperature recording, the two aforementioned means being responsive to reset switch 21 for said simultaneous activation (On-Site only).

The EEPROM is programmed to have a distinct Production Number or Indicia means for identifying the origin (related date and source) of that particular instrument (both In-Transit and On-Site).

The EEPROM is programmed to have a separate Serial Number means for numerically identifying that particular issue of the instrument (both In-Transit and On-Site).

The EEPROM is programmed to have a HIGH resolution Time Limited Temperature Recording means for short interval recording, preferably at 15 minute intervals, of sample time and temperature data stored into the EEPROM as read only serial available data (both In-Transit and On-Site, and including:

a) Means for recording Highest temperature,
b) Means for recording Lowest temperature,
c) Means for observing Current prevailing temperature,
d) Means for recording Block (trip duration ) data information,
e) Pointer means for indicating the last data recorded,
f) And, means for indicating days and hours recorded.

The EPROM is programmed to have an "In-Transit" Time Limited Temperature Recording means for limiting recording time data from the clock means to a prescribed trip or recorded time duration of for example and preferably to 5, 10, 20, 40 or 80 days (In-Transit only).

The EEPROM is programmed to have an "On-Site" continuously Extended Recording means for continued recording of time and temperature data to the limit or memory capacity of the EEPROM, which in practice is approximately 80 to 85 days.

The EEPROM is programmed to have a Begin Time Ignor means for deleting temperature samples from the beginning of a recording block or period, preferably four samples comprising one hour (both In-Transit and On-Site).

The EEPROM is programmed to have an End Time Ignor means for deleting temperature samples from the ending of the recording block, preferably four samples comprising one hour (In-Transit only).

PC software is provided to program Time Zone Compensating means for adding or subtracting the hour differential between each start and end international time zone, and for calculating total time time of recording within within or outside of the start time zone (both In-Transit and On-Site).

The EEPROM is programmed to have a Start Time Recording means for ducumenting the length (days and hours) of the recorded period (both In-Transit and On-Site).

PC software is provided to program a default readout means for dispalying the continuous extended low resolution time and temperature data.

The EEPROM is programmed to have a Start To End readout means for displaying the Time Limited Recording means high resolution time and temperature data.

The EEPROM is programmed to have a Power Loss Indicator means for documenting a time of instrument (battery) failure (both In-transit and On-Site).

The RAM is programmed to have a Display Time Limiting means for restricting the duration of the LCD display, thereby preventing prolonged battery discharge (both In-Transit and On-Site).

The EEPROM is programmed to have a Documentation Preservation means for preventing accidental erasure of RAM and EEPROM memory through actuation of any one of the switches 21, 23, 24 or 25 (both In-Transit and On-Site).

Thirdly, and in addition to the aforementioned ROM and EEPROM programming, software means for downloading is provided in the form of a diskett D2 or any other means, for transferring temperature data to the personal computer PC2, so that the consignee of an In-Transit instrument or the owner of an On-Site instrument can review the time and temperature record on screen G, or produce printouts C2 from printer P2; or in the form of a diskett D1 or any other means whereby the time and temperature data is transferred to the personal computer PC1 so that the source producer or manufacturer of the instrument can review the time and temperature record on screen G'. or produce printouts Cl from printer P1 (see FIG. 1).

Fourthly, software means for erasing information-data from the EEPROM is provided to clear the instrument time and temperature memory and serial number memory, to be replaced for the lease of a newly identified instrument.

Fifthly, software means for erasing programming for the EEPROM is provided to clear the memory for re-establishing either an In-Transit or an On-Site recorder instrument.

It is to be understood that programming of the several ROM and EEPROM means is selective as may be required and dictated by the capacity and availability of said memory means and by the desirability of permanent as distinguished from erasability of memory stored therein.

Having described only the preferred forms and applications of invention, do not wish to be limited or restricted to the specific details herein set forth, but wish to reserve to any modifications or variations that may appear to those skilled in the art as set forth within the limits of the following claims.

We claim:

1. A programmable thermograph system for time and temperature readout and documentation of temperatures during a time period, and including;
   a power supply means for low voltage direct current from a battery,
   a temperature sensor probe means for response to temperature and producing temperature related data,
   a microcontroller means having a Read Only Memory ROM means for programming with basic firmware including, a clock means for continuous running a Real Time Clock Calendar with time output data, and a default temperature recording means for continuous serial flow of clock means data and temperature sensor probe means data,
   a Random Access Memory RAM means for programming with software including, a time limited temperature recording means for recording for a limited time period and responsive to serial flow of clock means date and temperature sensor probe means data,
   an Electrical Erasable Programmable Read Only Memory EEPROM means for receiving and storing the time and temperature data from the clock means and from the temperature sensor probe means,
   a start means responsive to a reset switch for starting recording from the time limited recording means data and storing said data into the EEPROM,
   a time duration means responsive to a Time switch for ending recording stored in the EEPROM from the time limited recording means data,
   a readout means for the readout of the time limited recording means time and temperature data from the EEPROM, and alternately for the separate readout of the default recording means time and temperature data from the EEPROM.

2. The programmable thermograph as set forth in claim 1, wherein the power supply means is an unregulated three volt battery conditioned with a capacitor to ground and wired to the circuitry.

3. The programmable thermograph as set forth in claim 1, wherein the temperature sensor probe means is a variable resistance thermister in parallel with a precision linear resistor and with their negative outputs to the microcontroller means through a Schmidt trigger and with a capacitor to ground, whereby a precise voltage related to temperature is attained as data.

4. The programmable thermographs set forth in claim 1, wherein said temperature related data is processed by the microcontroller means which includes Fahrenheit resolving means for converting said temperature related data for readout at either of said separate readout means.

5. The programmable thermographs set forth in claim 1, wherein said temperature related data is processed by the microcontroller means which includes Celsius resolving means for converting said temperature related data for readout at either of said separate readout means.

6. The programmable thermographs set forth in claim 1, wherein said temperature related data is processed by the microcontroller means which includes separate Fahrenheit and Celsius resolving means for converting said temperature related data for readout at either of said separate readout means as Fahrenheit or Celsius temperature.

7. The programmable thermograph as set forth in claim 1, wherein the clock means includes time zone compensating means for the addition or subtraction of hours between a starting time zone and an ending time zone and for calculating actual time of recording as readout data.

8. The programmable thermograph as set forth in claim 1, wherein the default temperature recording means is a low resolution sampler of time and temperature data at widely separated long intervals.

9. The programmable thermograph as set forth in claim 1, wherein the time limited temperature recording means is a high resolution sampler of time and temperature data at closely separated short intervals.

10. The programmable thermograph as set forth in claim 1, wherein the ROM is programmed to have time and temperature data transfer means for storing said time and temperature data in the non-volitile EEPROM.

11. The programmable thermograph as set forth in claim 1, wherein the reset switch is a one-time switch for either activating the time limited recording means or activating a stop-start recording means and simultaneously activating a percentage of recording time "FULL" means indicating memory time used.

12. The programmable thermograph as set forth in claim 1, wherein functions are attained through manually operable switches including, a time switch actuating transfer means of day and hour data from the EEPROM means to the readout means, and an F° toggle switch having a first position activating transfer means of Fahrenheit temperature data from the EEPROM means through a Fahrenheit resolution means, and a second position activating a means for observing current Fahrenheit temperature data from said EEPROM means through the Fahrenheit resolution means.

13. The programmable thermograph as set forth in claim 1, wherein functions are attained through manually operable switches including, a time switch actuating transfer means of day and hour data from the EEPROM means to the readout means, and a C° toggle switch having a first position activating transfer means of Celsius temperature data from the EEPROM means through a Celsius resolution means, and a second position activating a means for observing current Celsius temperature data from said EEPROM means thorough the Celsius resolution means.

14. The programmable thermograph as set forth in claim 1, wherein the ROM is programmed to have means for separately recording the highest and lowest temperature related data in the EEPROM means, and wherein functions are attained through manually operable switches including a Time switch means for activating transfer means of day and hour data from the time EEPROM means to the readout means, and for separately activating transfer means of said highest and lowest Fahrenheit temperature data from the EEPROM means to the readout means.

15. The programmable thermograph as set forth in claim 1, wherein the ROM is programmed to have means for separately recording the highest and lowest temperature related data in the EEPROM means, and wherein functions are attained through manually operable switches including a Time switch means for activating transfer means of day and hour data from the time EEPROM means to the readout means, and for separately activating transfer means of said highest and lowest Celsius temperature data from the EEPROM means to the readout means.

16. The programmable thermograph as set forth in claim 1, wherein the ROM is programmed to have means for separately recording the highest and lowest temperature related data in the EEPROM means, and wherein functions are attained through manually operable switches including a Time switch means for activating transfer means of day and hour data from the time EEPROM means to the readout means and for simultaneously activating an enumerator means for displaying days and hours indicia at said readout means, and for separately activating transfer means of said highest and lowest Fahrenheit temperature data from the EEPROM means to the readout means, and for simultaneously actuating an enumerator means for displaying F° indicia at said readout means.

17. The programmable thermograph as set forth in claim 1, wherein the ROM is programmed to have means for separately recording the highest and lowest temperature related data in the EEPROM means, and wherein functions are attained through manually operable switches including a Time switch means for activating transfer means of day and hour data from the time EEPROM means to the readout means and for simultaneously activating an enumerator means for displaying days and hours indicia at said readout means, and for separately activating transfer means of said highest and lowest Celsius temperature data from the EEPROM means to the readout means, and for simultaneously actuating an enumerator means for displaying C° indicia at said readout means.

18. The programmable thermograph as set forth in claim 1, wherein the RAM is programmed to have a percentage of recording time "FULL" calculator and enunciator segment activating means responsive to the Time switch for indicating percentage of memory time used.

19. The programmable thermograph as set forth in claim 1, wherein the RAM is programmed to have a distinct Indicia means for identifying the origin of that thermograph, for subsequent readout.

20. The programmable thermograph as set forth in claim 1, wherein the RAM is programmed to have a separate Serial Number means for identifying that particular thermograph, for subsequent readout.

21. The programmable thermograph as set forth in claim 12, wherein the RAM is programmed to have Documentation Preservation means for preventing accidental erasure of memory through operation of any one said aforementioned switches.

22. The programmable thermograph as set forth in claim 1, wherein the ROM is programmed to have a monitor means for responding to a personal computer PC command signals through a connector.

23. The programmable thermograph as set forth in claim 1, wherein the RAM is programmed to have a Time Limited Recording means for limiting recording time to a prescribed time duration.

24. The programmable thermograph as set forth in claim 1, wherein the RAM is programmed to have a Begin Time Ignor means for deleting temperature samples from the beginning of a recording.

25. The Programmable thermograph as set forth in claim 1, wherein the RAM is programmed to have an End Time Ignor means for detecting temperature samples from the ending of a recording.

26. A programmable In-Transit thermograph and system compatible with a personal computer PC for time and temperature readout and documentation of temperature during a limited time period, the thermograph including;

a power supply means for low voltage direct current from an internal battery, a Driver Receiver with a PC connector and comprised of an operational amplifier means increasing the low thermograph data voltage to a higher PC data voltage in an outgoing data circuit from the thermograph and through said connector, and of a voltage reducer means decreasing the higher PC data voltage to the lower thermograph data voltage in an incoming data circuit from the PC and through said connector, a temperature sensor probe means for response to temperature and producing temperature related data, a microcontroller means having a Read Only Memory ROM means for programming with basic firmware including, a clock means for continuous running a Real Time Clock Calendar with time output data, and a default temperature recording means for continuous serial flow of clock means data and temperature sensor probe means data, a Random Access Memory RAM means for programming with software including, a time limited temperature recording means for recording for a limited time period and responsive to serial flow of clock means data and temperature sensor probe means data, an Electrical Erasable Programmable Read Only Memory EEPROM means for receiving and storing the time and temperature data from the clock means and from the temperature sensor probe means, a start means responsive to a reset switch for starting recording from the time limited recording means data and storing said data into the EEPROM, a time duration means responsive to a Time switch for ending recording of time and temperature data stored in the EEPROM from the time limited recording means data, and a readout means for the readout of the time limited recording means time and temperature data from the EEPROM, and alternately for the separate readout of the default recording means time and temperature data from the EEPROM, the Driver Receiver being powered by the PC through said connector, whereby the thermograph time and temperature stored data can be viewed and processed by the PC.

27. A programmable On-Site thermograph and system compatible with a personal computer PC for time and temperature readout and documentation of continued temperature recording during sequential time periods, the thermograph including;

a power supply means for low voltage direct current from an internal battery, a Driver Receiver with a PC connector and comprised of an operational amplifier means increasing the low thermograph data voltage to a higher PC data voltage in an outgoing data circuit from the thermograph and through said connector, and of a voltage reducer means decreasing the higher PC data voltage to the lower thermograph data voltage in an incoming data circuit from the PC and through said connector, a temperature sensor probe means for response to temperature and producing temperature related data, a microcontroller means having a Read Only Memory ROM means for programming with basic firmware including, a clock means for continuous running a Real Time Clock Calendar with time output data, and a default temperature recording means for separate readouts of time and temperature sensor probe means data from the EEPROM, a Random Access Memory RAM means for programming with software including, a stop-start temperature recording means for stopping a preceeding time and temperature recording while simultaneously starting a subsequent time and temperature recording, an Electrical Erasable Programmable Read Only Memory EEPROM means for receiving and 'storing the time and temperature data from the clock means and from the temperature sensor probe means, a start means in the form of a reset switch for activating the stop-start temperature recording means and storing said preceeding time and temperature data in the EEPROM, a time readout means responsive to a Time switch for reading time data stored from the EEPROM, and a temperature readout means responsive to a toggle switch for activating a High-Low temperature display of the temperature data from the EEPROM, and alternately for dispalying current temperature data from the EEPROM, the Driver Receiver being powered by the PC through said connector, whereby the thermograph time and temperature stored data can be viewed and processed by the PC.

* * * * *